March 18, 1930.                     C. R. REID                    1,751,421
              APPARATUS FOR REMOVING WATER BORNE MATERIAL
                       FROM RACEWAYS AND THE LIKE
                          Filed Sept. 10, 1928          3 Sheets-Sheet 3

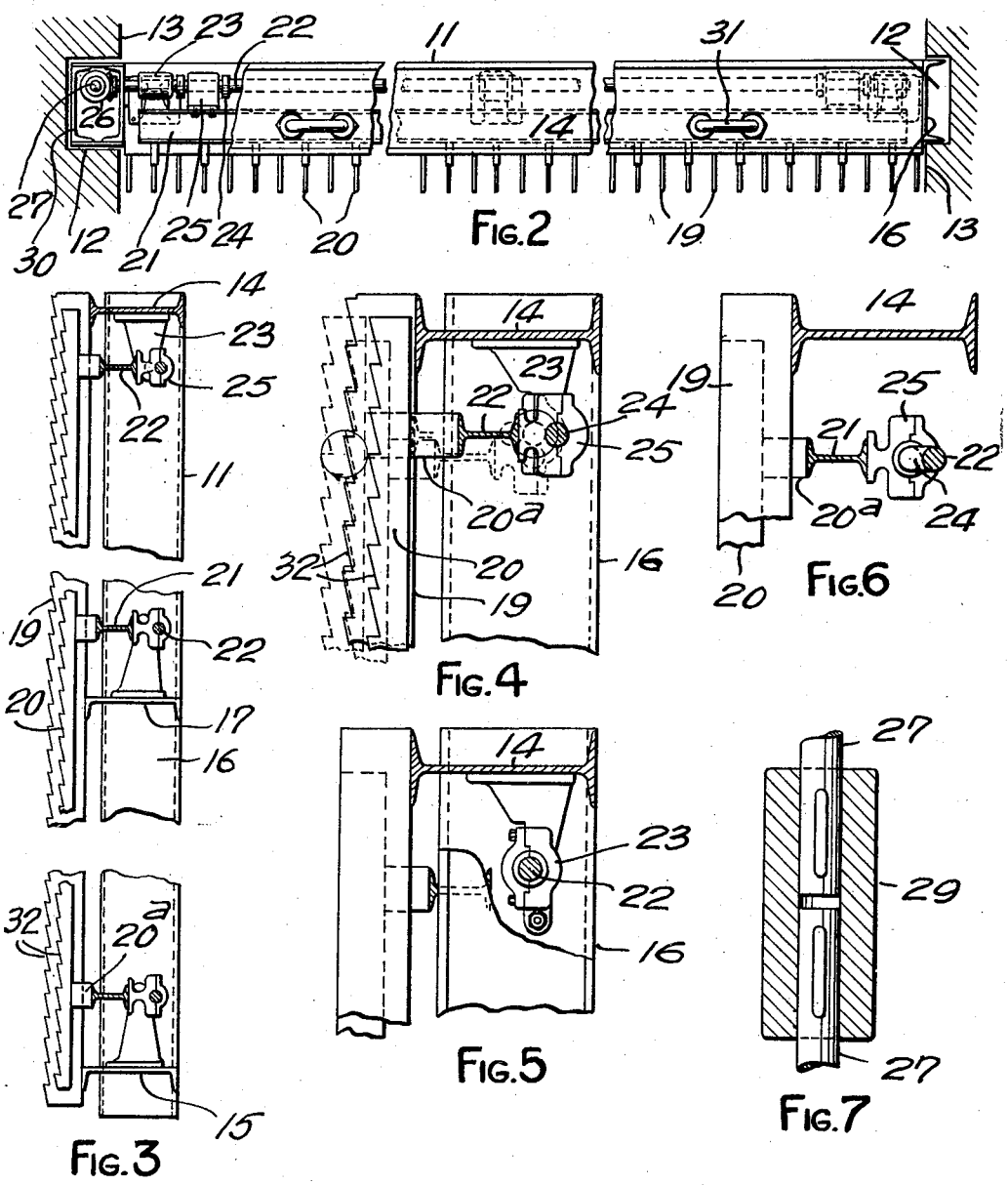

Inventor
Charles R. Reid
By
Attorney

Patented Mar. 18, 1930

1,751,421

UNITED STATES PATENT OFFICE

CHARLES R. REID, OF SHAWINIGAN FALLS, QUEBEC, CANADA

APPARATUS FOR REMOVING WATER-BORNE MATERIAL FROM RACEWAYS AND THE LIKE

Application filed September 10, 1928. Serial No. 304,965.

This invention relates to improvements in racks for removing water borne material, such as branches of trees, weeds, etc. whether floating or submerged, from water courses such as those leading to turbines or pumps, and the object is to provide a device of this class which will not only separate the rubbish from the water flowing through but which will be self-clearing to avoid obstruction to water flow and damage to itself through water pressure upon collected rubbish.

A further object is to provide a rack which will not become choked with frazil.

A still further object is to provide a rack which will raise all collected submerged rubbish to the surface of the water so that it may be removed.

Another object is to provide a device of this character which may be made in comparatively small, self contained and easily handled sections, in order to facilitate insertion in and removal from deep channels.

Various other objects and the advantages of the invention may be ascertained from the following description and the accompanying drawings.

The invention resides briefly in the provision of a rack having a frame composed of as many sections as desirable, each carrying a series of parallel bars relatively movable in their longitudinal directions with a circular movement, and means in each section for effecting the relative movement of the bars. The bars are arranged in two or more series and relative movement is effected by having one or more series of bars stationary and the remainder movable or by having all the bars moving in opposite directions at any instant.

In the accompanying drawings which illustrate certain embodiments of the invention but to the details of which the invention is not confined, as numerous modifications of detail and substitutions of equivalents may be effected without departing from the spirit of the invention:—

Fig. 2 is a plan view of a rack section.

Fig. 3 is a vertical sectional view of a rack section at the line 3—3 of Figure 1.

Fig. 4 is a fragmentary vertical sectional view similar to Figure 3 but on an enlarged scale.

Fig. 5 is a view similar to Figure 4 with the connecting rod removed to disclose the shaft bearings.

Fig. 6 is a view similar to Figure 4 showing the eccentric portions of the operating shafts.

Fig. 7 is a sectional view of one of the driving couplings between the rack sections.

Figure 1:
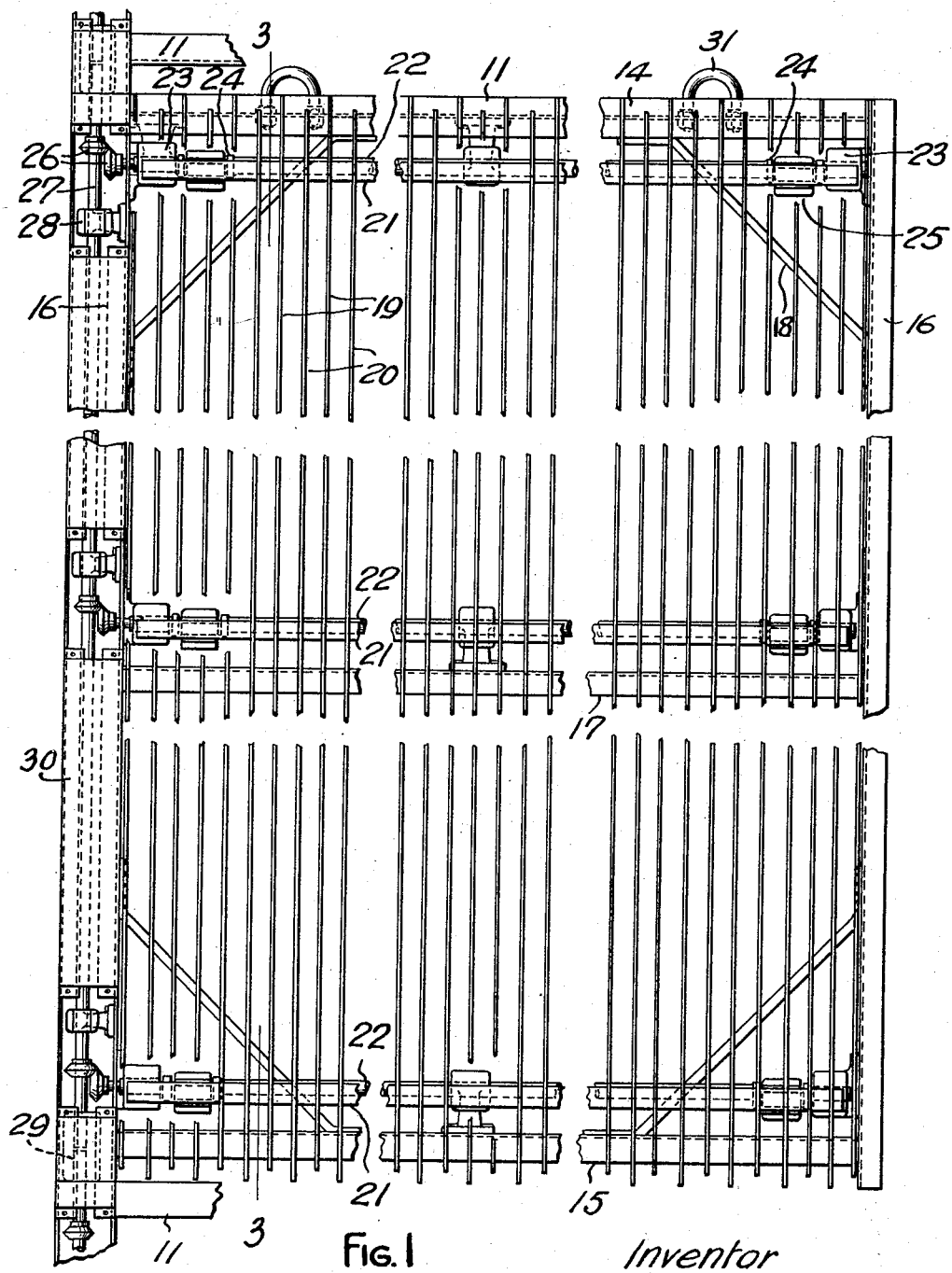
Fig. 1 is a front elevation of one section of a rack constructed according to this invention together with fragments of the racks which may be located above and below it.

Referring more particularly to the drawings, and especially to Figures 1 to 7 thereof, 11 designates a plurality of rack sections adapted to be located one above the other on edge in guiding grooves or channels 12 formed in walls or piers 13 in a water course, such as the head race leading to a wheel house. Each of the frame sections comprises top and bottom members 14 and 15 respectively, side members 16 and as many transverse intermediate members 17 as are desired, together with the usual or necessary diagonal bracing 18. These members are secured together in any suitable way to form a rigid rectangular frame. A series of vertical bars 19 are rigidly secured to the top, bottom and intermediate frame members and a second series of vertical bars 20 are disposed alternately with the bars 19 but are separate from the frame, so that they may be moved relatively to the bars 19. The movable bars are rigidly connected at the top, bottom and one or more intermediate points in the frame to transverse carriers 21 which are entirely separate from the rack frame, fillers 20ª being provided between the bars and carriers so that the carriers may be located a sufficient distance from the bars 19. The bars of each series are rectangular in cross section and are disposed edgewise to the flow of water through them as is customary, so as to offer the least possible obstruction to water flow and to have the greatest possible strength in resisting pressure on them due to accumulation of rubbish. Preferably, each set of bars is of sufficient strength to withstand the full pressure of water in the event of rubbish accumulating against the bars to such an extent as to substantially prevent flow of water past the rack.

Transverse shafts 22 are provided at the top and bottom of the frame and, if desired, at one or more intermediate levels in the height of the frame. These shafts are mounted in bearings 23 secured to the top, bottom and intermediate frame members 14, 15 and 17 respectively or to the vertical side frame members 16. These bearings are disposed at the ends of the shafts and at as many points in the length of the shaft as may be desirable. The spacing of the shafts 22 and of the bar carriers 21 is preferably such that the shafts are immediately behind or on the downstream side of the carriers. The shafts are provided adjacent their ends and at as many intermediate points as may be desired with eccentric portions or cranks 24. A series of connecting rods or bearings 25 are rigidly connected to the carriers 21 and operatively engage the eccentrics or cranks 24. One end of each of the shafts 22 is connected by bevel gears 26 with a vertical shaft 27 mounted in bearings 28 on the adjacent vertical frame member 16. The lower end of the shaft 27 in each section is provided with a coupling device 29, such as a sleeve projecting beyond the end of the shaft, and the upper end of each shaft 27 is adapted for operative engagement with the coupling of the corresponding shaft in the section above. These couplings are of such character that the shafts can be connected in only a single angular relation and, while the arrangement shown is a single key and slot, it will be understood that this arrangement is merely for purposes of illustration and that any other suitable form of coupling may be used.

A housing 30 is provided on the vertical frame member 16, to which the shaft 27 is attached to protect the shaft and gearing. Lifting eyes 31 are preferably mounted in the top frame member 14 of each rack section.

The upstream edges of the bars may be ratchet-toothed, as shown in Figures 3 and 4, the teeth 32 having upper substantially horizontal flanks and lower inclined flanks, so that the teeth may be said to face upwardly. Alternatively, the upstream edges of the bars may be plain, as shown in Figure 5.

Figure 9:
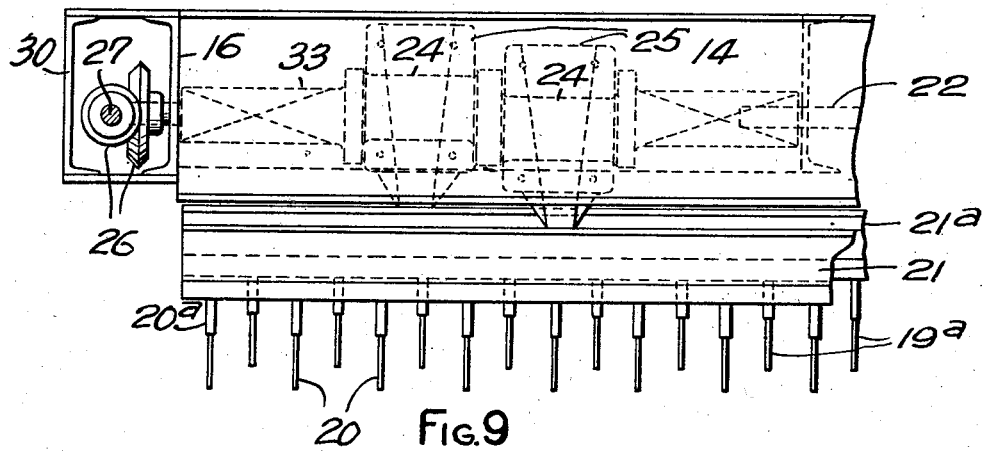
Fig. 9 is a fragmentary plan view of the modification shown in Figure 8.
Figure 8:
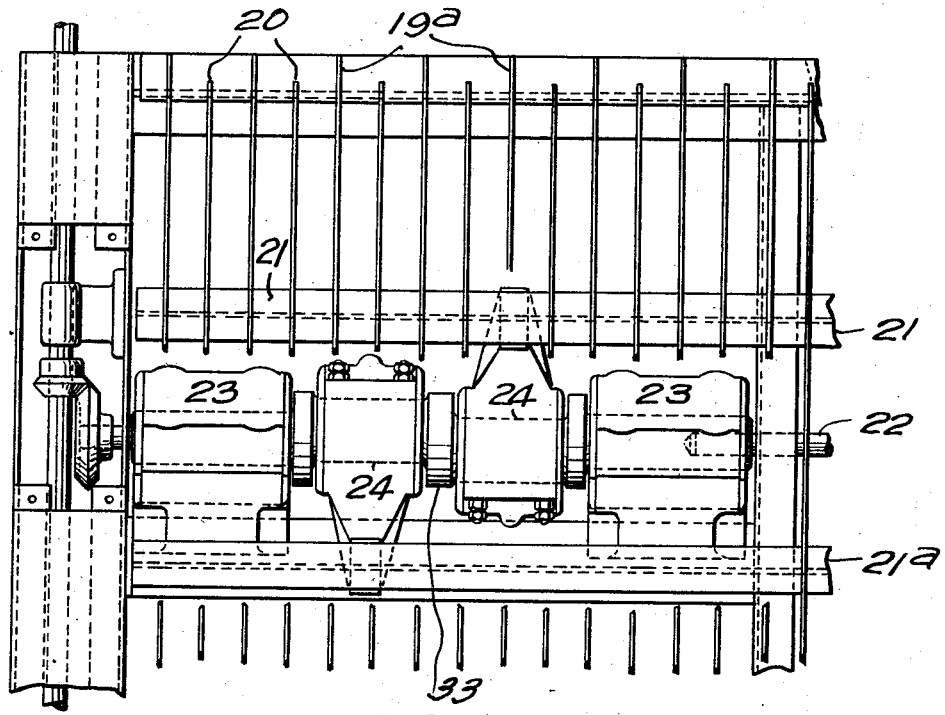
Fig. 8 is a fragmentary front elevation illustrating a modification.

The arrangement thus far shown is of the most simple character embodying one set of stationary bars and one set of moving bars. In Figures 8 and 9 there is shown an arrangement embodying two sets of moving bars. In this modification, the frame construction is for all practical purposes identical with that already described. In place of there being a single transverse bar carrier 21 at top and bottom and intermediate levels, two such carriers, designated 21 and 21$^a$, are provided at each of the locations. One set of bars, designated 20, is connected to one of the sets of carriers, for example, the carriers 21. The second set of bars, designated 19$^a$, are connected to the carriers 21$^a$, fillers 20$^a$ being provided between the bars and carriers as previously described.

In this construction, the shafts 22 instead of being immediately behind the bars 21 are located at levels approximately midway between the levels of the adjacent carriers 21 and 21$^a$, as clearly shown in Figure 8, and are mounted in bearings secured to the frame members as already described. In this modification, the cranks or eccentrics 24 are arranged in pairs, the cranks of each pair being off-set, as clearly shown in Figure 8. Similarly to the cranks, the connecting rods 25 are connected in pairs, one rod of each pair being connected to a carrier 21 and the other to a carrier 21$^a$.

There is illustrated in Figure 8 one very convenient and inexpensive method of forming the cranks and bearings especially in structures where two or more sets of bars are to be moved. This method consists in forming the cranks and adjacent journals in a single casting or forging, designated 33, which is mounted on the shaft 22. When this construction is resorted to, the shaft may be continuous across the rack section, as shown in Figure 1, or may be in a number of separate lengths connected to the ends of the castings 33 as shown in Figure 8.

The structure shown in Figures 8 and 9 is in other respects essentially the same as that shown in Figures 1 to 7.

The operation of the device is as follows:—

If the depth of water necessitates the use of two or more superposed rack sections, these are lowered one after the other in the guide grooves 12, so that the coupling 29 of each upper section meshes with the upper end of the shaft 27 in the section next below. The couplings may be set in proper meshing position before the sections are lowered but, even if this is not done, the coupling and shaft may be meshed by partial rotation of the shaft 27. When the rack sections are lowered into place, the upper end of the shaft 27 in the uppermost section is connected in any suitable way to a source of power, such as an electric motor, and the shaft 27 is continuously rotated and similarly rotates the corresponding shafts of the section beneath. This rotation is transmitted through the gears 26 to the transverse shafts 22. Because of the rigid attachment of the connecting rods 25 to the carriers 21 of the movable rack bars, the whole frame comprising the carriers 21 and bars 20 is caused to move in a small vertically disposed circular orbit, in such direction that the movable bars 20 advance beyond or upstream from the fixed bars 19, then rise and retreat behind the upstream edges of the fixed bars 19, and finally descend to the starting point. Water borne rubbish is held by the flow of water quite tightly against the rack. In its outward or upstream movement, the movable rack comprising the carriers 21 and bars 20 moves this rubbish upstream away from the stationary bars and, at the same time, lifts it to a slightly higher elevation. When the moving rack retreats behind the stationary rack, the rubbish is held against the stationary rack at a slightly higher elevation than before and the moving rack then descends and obtains a fresh grip on the rubbish at a lower point. This continuous operation lifts submerged rubbish to the surface of the stream where it may be readily removed by hand or by any suitable form of mechanical clearing device. While it is perhaps not necessary to provide teeth 31 on the upstream edges of the rack bars, these may be provided to minimize the possibility of rubbish slipping down, especially if the velocity of the water flow is not great. Obviously, the teeth, if any, may be of whatever size, shape or spacing is found most suitable to local conditions. When the moving rack lifts the rubbish away from the stationary rack, it is obvious that the full pressure due to head and velocity of the water and to the amount of obstruction in the channel must be sustained by the moving rack in the same way that this pressure is sustained by the stationary rack when the moving rack happens to be out of contact with the rubbish. It is for this reason that each rack must be of sufficient strength to withstand the maximum load which would be imposed if the flow of water should be completely blocked. The moving rack is well able to withstand such pressures without buckling or warping, by reason of the fact that it is supported and receives its motion at a plurality of points; in the simple form illustrated in Figure 1 at six points. When the shafts 27 of two or more superposed sections are coupled together, the moving racks of the sections move in unison, so that there is no interruption to the upward passage of rubbish. This movement in unison is necessary both to avoid the moving bars of one section interfering with those of another and to permit of very close spacing of the adjacent ends of the bars, so that there will be no appreciable horizontal space between the sections into which rubbish may enter. In this way, the rack itself is guarded against damage as well as the turbines or other devices which the rack is intended to protect.

In the form shown in Figures 7 and 8, the effect produced is the same and the operation is the same except that in place of a stationary rack there is a second moving rack which follows the first moving rack in its orbit, the rack on the upstream side moving upwardly while the rack on the downstream side descends in readiness to move upstream and upwardly. Obviously, the number of moving racks in each section may be increased as desired and any desired number of moving racks may be combined with a stationary rack.

Having thus described my invention, what I claim is:—

1. A straining rack for water courses comprising a framework and a plurality of substantially vertical bars, and means for imparting an orbital movement to certain of the bars relatively to other bars while maintaining the upstream faces of all the bars in parallelism.

2. A straining rack for water courses, comprising a framework and a plurality of series of vertical relatively movable bars carried thereby, and means for moving the bars in suchwise that the bars of one series advance edgewise in the upstream direction beyond the upstream edges of the bars of the other series and then move upwardly in substantially the direction of their length and then move edgewise in a downstream direction until their upstream edges have retreated downstream from the plane of the upstream edges of the bars of the other series and finally move downwardly in the direction of their length, said means serving also to maintain the upstream faces of the bars of the first series in parallelism with one another and with the bars of the other series.

3. A straining rack for water courses comprising a frame and a plurality of series of substantially vertical bars carried thereby, the bars of one series being rigidly secured to the frame, and the other bars being movable, and means for moving the movable bars in orbits lying in parallel vertical planes and for maintaining the upstream faces of the fixed and movable bars in parallelism.

4. A device according to claim 1, in which the bars are toothed on their upstream edges, the teeth presenting substantially horizontal upper flanks and inclined lower flanks.

5. A straining rack for water courses, comprising a rigid frame, a series of substantially vertical flat bars rigidly connected edgewise to said frame, a second series of bars alternated with the first bars, transverse carriers for the bars of the second series, a plurality of crank shafts journalled in the frame, connecting rods operatively related to the cranks of said crank shafts and rigidly connected to the bar carriers, and means for rotating said shafts in unison.

6. A straining rack for water courses comprising a rigid frame including upright side members, top, bottom and intermediate rails connected between the side members, a plurality of series of bars, the bars of one series being rigidly secured to the frame rails and the remaining bars being movable, transverse carriers for the moving bars, top, bottom and intermediate crank shafts journalled in the frame, connecting rods operatively related to the cranks of said crank shafts and rigidly connected to the transverse bar carriers, and means for moving said crank shafts in unison comprising a vertical shaft journalled on one side frame member, a gear connection between said vertical shaft and the top, bottom and intermediate shafts, and a housing for said vertical shaft and gear connections.

7. A straining rack for water courses comprising a rigid frame including upright side members, and top, bottom and intermediate transverse members, a series of upright flat bars rigidly secured in edgewise relation to the frame, top, bottom and intermediate transverse crank shafts journalled in the frame, top, bottom and intermediate movable bar carriers located at substantially the same levels as said shafts and on the upstream side thereof, connecting rods operatively related to the cranks of said crank shafts and rigidly attached to said bar carriers, a second series of flat bars alternated with the bars of the first series and rigidly connected to the carriers, and means for operating said crank shafts in unison to cause the movable bars to move alternately in an upstream and upward direction beyond the upstream edges of the stationary bars and with a downstream and downward direction behind the upstream edges of the stationary bars.

8. Means for removing submerged water-borne rubbish from water courses comprising a plurality of series of substantially vertical bars adapted to be located in the water course, the bars of the several series being alternated, and means for supporting and maintaining the upstream faces of all the bars in parallelism and for relatively moving the bars of the several series in orbits occupying parallel vertical planes, the direction of movement being such that the bars of one series advance upstream from the bars of the other series to support rubbish water-pressed against them and then move upward and retreat downstream behind the plane of the upstream edges of other bars, thereby to bodily raise rubbish and allow it to be pressed against the bars of the other series at a higher level.

9. A straining rack for water courses, comprising a plurality of sections adapted to be superposed in edge to edge relation, each of said sections comprising a plurality of bars movable relatively to other bars, and means for moving the bars, and means to couple the operating means of the sections together whereby corresponding bars thereof will operate in unison.

10. A straining rack for water courses comprising a plurality of sections to be superposed in edge to edge relation, each of said sections comprising a framework and a plurality of bars carried thereby and movable relatively to other bars, top, bottom and intermediate crank shafts, operative connection between the crank shafts and said relatively movable bars, means to operate the crank shafts in unison including a vertical shaft, and coupling means at the ends of the vertical shaft adapted to operatively connect the same in a single predetermined relation with the vertical shafts of sections next above and below, whereby corresponding bars of all sections will move in unison.

11. A device according to claim 10 in which corresponding bars of upper and lower sections are in alignment and closely spaced end to end relation.

12. A device according to claim 5 in which the crank shafts comprise straight shaft portions and crank and journal portions separate from the shafts and irrevolubly connected thereto.

13. A straining rack for water courses comprising a framework, and a plurality of substantially vertical bars, and means carried by the framework for moving certain of the bars upstream and vertically upward relatively to the other bars, the said movement being substantially uniform in extent from top to bottom of the bars.

14. A straining rack for water courses comprising a framework, and a plurality of substantially vertical bars supported at top, bottom and intermediate points, and means carried by the framework for moving certain of the bars upstream and vertically upward relatively to the other bars, the said movements being substantially uniform in extent from top to bottom of the bars.

15. A straining rack for water courses comprising a framework, a series of bars rigidly supported at top, bottom and intermediate points by said framework, a second series of bars, means carried by the framework movably supporting the second series of bars at top, bottom and intermediate points, said means being adapted to move the second series of bars upstream and vertically upward relatively to the other bars, the said movements being substantially uniform in extent from top to bottom of the bars.

In witness whereof, I have hereunto set my hand.

CHARLES R. REID.